United States Patent
Bzymek et al.

(10) Patent No.: US 9,909,513 B2
(45) Date of Patent: Mar. 6, 2018

(54) FUEL SYSTEM PROTECTION IN A MULTI-FUEL SYSTEM INTERNAL COMBUSTION ENGINE

(71) Applicants: Westport Power Inc., Vancouver (CA); GM Global Technology Operations LLC, Detroit, MI (US)

(72) Inventors: Raymond Bzymek, Northville, MI (US); Mark E. Dunn, Vancouver (CA); Ning Wu, Vancouver (CA); Dehong Zhang, Vancouver (CA); Craig D. Marriott, Pontiac, MI (US); Joshua D. Cowgill, Milford, MI (US); Ben W. Moscherosch, Waterford, MI (US)

(73) Assignees: WESTPORT POWER INC., Vancouver, CA (US); GM GLOBAL TECHNOLOGY OPERATIONS LLC, Detroit, MI (US)

( * ) Notice: Subject to any disclaimer, the term of this patent is extended or adjusted under 35 U.S.C. 154(b) by 497 days.

(21) Appl. No.: 14/569,767

(22) Filed: Dec. 14, 2014

(65) Prior Publication Data

US 2015/0096530 A1  Apr. 9, 2015

Related U.S. Application Data

(63) Continuation of application No. PCT/CA2013/050451, filed on Jun. 13, 2013.
(Continued)

(51) Int. Cl.
*F02M 43/00* (2006.01)
*F02D 19/06* (2006.01)
(Continued)

(52) U.S. Cl.
CPC ........ *F02D 19/0626* (2013.01); *F02B 17/005* (2013.01); *F02D 19/061* (2013.01);
(Continued)

(58) Field of Classification Search
CPC ............. F02D 19/0626; F02D 19/0631; F02D 19/081; F02D 19/0623; F02D 19/061;
(Continued)

(56) References Cited

U.S. PATENT DOCUMENTS 3,605,703 A  9/1971  Moulds
3,684,318 A  8/1972  Eckert et al.
(Continued)

FOREIGN PATENT DOCUMENTS

CN  101040111 A  9/2007
CN  101311516 A  11/2008
(Continued)

OTHER PUBLICATIONS

Search Report issued by the EPO dated Feb. 5, 2015 in connection with co-pending European Appliction No. 13804568.7.
(Continued)

*Primary Examiner* — David Hamaoui
(74) *Attorney, Agent, or Firm* — Seed IP Law Group LLP

(57) ABSTRACT

A technique for fuel system protection for an internal combustion engine includes introducing a directly injected fuel into a combustion chamber through a direct fuel injector, introducing a fumigated fuel upstream of an intake valve, selectively operating the internal combustion engine with at least one of the directly injected fuel and the fumigated fuel, determining a temperature of the direct fuel injector as a first function of engine operating parameters, and performing a temperature mitigation technique when the
(Continued)

temperature rises above a first predetermined value such that the temperature is maintained below a second predetermined value.

17 Claims, 11 Drawing Sheets

Related U.S. Application Data

(60) Provisional application No. 61/659,704, filed on Jun. 14, 2012.

(51) Int. Cl.

| | | |
|---|---|---|
| *F02D 41/00* | (2006.01) | |
| *F02D 19/10* | (2006.01) | |
| *F02B 17/00* | (2006.01) | |
| *F02D 19/08* | (2006.01) | |

(52) U.S. Cl.
CPC ..... *F02D 19/0623* (2013.01); *F02D 19/0631* (2013.01); *F02D 19/0647* (2013.01); *F02D 19/081* (2013.01); *F02D 19/10* (2013.01); *F02D 41/0025* (2013.01); *F02M 43/00* (2013.01); *F02D 19/0615* (2013.01); *F02D 19/0689* (2013.01); *F02D 19/0692* (2013.01); *F02D 41/0027* (2013.01); *Y02T 10/36* (2013.01)

(58) Field of Classification Search
CPC .. F02D 19/0647; F02D 19/10; F02D 41/0025; F02D 19/0692; F02D 19/0689; F02D 19/0615; F02D 41/0027; F02B 17/005; F02M 43/00; Y02T 10/36
See application file for complete search history.

(56) References Cited

U.S. PATENT DOCUMENTS

| | | | |
|---|---|---|---|
| 5,331,939 A | 7/1994 | Trombley et al. | |
| 6,518,763 B2 | 2/2003 | Sollart | |
| 6,598,471 B2 | 7/2003 | Imoehl | |
| 6,609,495 B1 | 8/2003 | Cornell et al. | |
| 6,691,677 B2 | 2/2004 | Eckerle et al. | |
| 6,832,593 B2* | 12/2004 | Imoehl | F02B 17/00 123/294 |
| 6,877,486 B2* | 4/2005 | Ellies | F02D 41/065 123/478 |
| 7,529,614 B1* | 5/2009 | Muller | F02B 37/16 123/559.1 |
| 7,845,334 B2* | 12/2010 | Lippa | F02D 19/0684 123/431 |
| 7,848,874 B2 | 12/2010 | Hay et al. | |
| 7,853,397 B2 | 12/2010 | Pott et al. | |
| 8,118,010 B2* | 2/2012 | Shibata | F02D 41/3035 123/295 |
| 9,476,367 B2* | 10/2016 | Dunn | F02D 41/008 |
| 9,500,168 B2* | 11/2016 | Takarai | F02M 43/00 |
| 2006/0213482 A1 | 9/2006 | Shibagaki et al. | |
| 2006/0254562 A1 | 11/2006 | Akita | |
| 2007/0261675 A1 | 11/2007 | Akita et al. | |
| 2009/0090332 A1* | 4/2009 | Brehob | F02D 35/025 123/464 |
| 2009/0241896 A1 | 10/2009 | Fiveland et al. | |
| 2010/0094527 A1 | 4/2010 | Futonagane et al. | |
| 2010/0131178 A1 | 5/2010 | Pott et al. | |
| 2011/0288751 A1 | 11/2011 | Kurtz | |
| 2015/0275813 A1* | 10/2015 | Dunn | F02D 41/3094 123/445 |
| 2016/0032857 A1* | 2/2016 | Wu | F02D 41/221 701/105 |

FOREIGN PATENT DOCUMENTS

| | | | |
|---|---|---|---|
| GB | 2490522 A | 11/2012 | |
| JP | 11351041 A | 12/1999 | |
| JP | 2009051288 A | 3/2009 | |
| JP | 2009197807 A | 9/2009 | |

OTHER PUBLICATIONS

Search Report issued by SIPO dated Apr. 26, 2016 in connection with co-pending China Application No. 201380031462.3.

International Search Report and Written Opinion of the International Searching Authority dated Aug. 15, 2013 in connection with International Application No. PCT/CA2013/050451.

International Preliminary Report on Patentability and Written Opinion of the International Bureau dated May 5, 2014, in connection with PCT/CA2013/050451.

Konigsson, F., et al. "Controlling the injector tip temperature in a diesel dual fuel engine", SAE Technical Paper No. 2012-01-0826, published Apr. 2012.

* cited by examiner

FUEL SYSTEM PROTECTION IN A MULTI-FUEL SYSTEM INTERNAL COMBUSTION ENGINE

CROSS-REFERENCE TO RELATED APPLICATIONS

This application is a continuation of International Application No. PCT/CA2013/050451 having an international filing date of Jun. 13, 2013, entitled "Fuel System Protection In A Multi-Fuel System Internal Combustion Engine", which is related to and claims priority benefits from U.S. Provisional Application Ser. No. 61/659,704 filed on Jun. 14, 2012, also entitled "Fuel System Protection In A Multi-Fuel System Internal Combustion Engine". This application also claims priority benefits from the '704 provisional application. Each of the '451 international application and the '704 provisional application is hereby incorporated by reference herein in its entirety.

FIELD OF THE INVENTION

The present application relates to a technique of fuel system protection in a multi-fuel system internal combustion engine that operates in a plurality of fuelling modes.

BACKGROUND OF THE INVENTION

Natural gas is employed as an alternative fuel for vehicles to replace conventional liquid fuels like gasoline and diesel. There are a number of factors motivating the use of natural gas, of which, two are cost and emissions. On an energy equivalent basis natural gas is less expensive than petroleum based fuels. The price of crude oil continues to increase as production continues to outpace discoveries of new oil reserves. In contrast, the reserves of natural gas continue to increase as production lags behind the discovery of new reserves keeping the price well below oil. Engines fuelled with natural gas produce fewer emissions than engines fuelled with either gasoline or diesel. Due to ever more stringent emission standards engine manufacturers are looking to natural gas to meet these new standards.

The refueling infrastructure for natural gas vehicles is not as extensive as that for conventional liquid fuels; this is a factor that influences adoption of natural gas vehicles especially for consumer automobiles. Access to refueling stations is currently limited to urban areas and main transportation corridors which limits the range of travelling and requires vehicle operators to make planned refueling trips. For these reasons natural gas has had greater adoption in the heavy duty diesel trucking industry since these vehicles typically operate along the natural gas corridor and/or use private refueling facilities. However, due to the above factors motivating the use of natural gas, automobile manufacturers are beginning to integrate natural gas fuel systems alongside existing gasoline fuel systems and to adapt internal combustion engines to be fuelled with more than one fuel, these being referred to in this disclosure as "multi-fuel engines".

In this disclosure, the terms "natural gas" and "gas" are used interchangeably and understood to be preferred examples of a gaseous fuel, but that other gaseous fuels such as ethane, methane, propane, biogas, landfill gas, dimethyl ether, hydrogen and mixtures thereof could also be employed instead of natural gas. In one such multi-fuel engine there is a direct injection fuel system which introduces liquid fuel directly into combustion chambers, and a natural gas port injection fuel system which introduces natural gas into the intake air upstream of intake valves. In this engine liquid fuel remains dormant in direct fuel injectors that are not being actuated when operating in a port injection natural gas fuelled mode. In this mode, because the nozzles of the direct fuel injectors are located in the combustion chamber it is possible that heat from combustion of port injected fuel elevates the temperature of the liquid fuel inside the direct fuel injectors above a threshold temperature such that the injectors are damaged or carbon deposits begin form. The formation of these carbon deposits leads to fouling of the direct fuel injectors impacting the performance of liquid fuel injection.

In another engine system there are both liquid fuel direct and port fuel injection systems. Depending upon the current operating mode the engine can be fuelled with either the direct or port fuel injection system or both simultaneously. The liquid fuel that is used to fuel the engine and delivered to the direct and port fuel injection systems can be the same fuel or different fuels if the engine is a multi-fuel engine. For example, when the engine starts it is advantageous to fuel from the direct injection system in a stratified charge mode, and when under high load or speed the engine can fuel from the port injection system in a premixed mode. Direct fuel injectors can become fouled when liquid fuel remains dormant inside while operating the engine with fuel from the port injection system.

U.S. Pat. No. 7,853,397, issued Dec. 14, 2010 to Pott et al. (the '397 patent), discloses a method of operating an internal combustion engine that operates with carburetor fuel, injected through a high pressure direct injector, and with gas fuel introduced into the intake air manifold or ports. In gas operation there is the risk that the high pressure direct injectors heat up due to the lack of through-put of liquid fuel and are subsequently damaged or the fuel located inside forms deposits which have an adverse effect on injector behavior. To avoid these problems, a load characteristic of the high pressure fuel injector is determined and if this load is above a limit value then switchover to carburetor fuel operation is performed, or carburetor fuel operation is hooked into gas operation such that the fuel in the high pressure injector is purged and the injector is cooled. Based on engine temperatures (operating parameters) a thermal load upon the fuel injector is retrieved from a weighing characteristic map, which is integrated over time to determine the load characteristic value. The method of the '397 patent does not determine the temperature of the high pressure injector, but instead determines stored energy representing the empirical thermal load upon the injector. As a result, during gas operation carburetor fuel can be consumed unnecessarily based on the stored energy value even though the temperature of the fuel injector is below a critical value above which deposits begin to form. The method of the '397 patents determines the thermal load upon the high pressure injector during gas operation only, and does not continuously determine the thermal load for all fuelling modes (gas operation, carburetor fuel operation and mixed fuel operation). That is, during gas operation when it is determined that the thermal load is above the limit value, carburetor fuel is flowed through the high pressure fuel injector to purge fuel and cool the injector. The amount of liquid fuel flowed through the injector is based on a predetermined minimum volume, which is expected to cool the injector, instead of the volume required to reduce the temperature of the fuel injector below the critical value at which deposits begin to form. Again, during gas operation, this results in unnecessary and increased carburetor fuel operation.

The state of the art is lacking in techniques for protecting direct injectors in multi-fuel system engines that reduce or minimize the amount of directly injected fuel that is introduced to cool the direct injectors. Accordingly, for engines that can be fuelled through a direct injection system as well as by means of another fuel system there is a need for an improved method of protecting the direct injector when operating with the other fuel system.

SUMMARY OF THE INVENTION

An improved method of fuel system protection for an internal combustion engine includes introducing a directly injected fuel into a combustion chamber through a direct fuel injector; introducing a fumigated fuel upstream of an intake valve; selectively operating the internal combustion engine with at least one of the directly injected fuel and the fumigated fuel; determining a temperature of the direct fuel injector as a first function of engine operating parameters; and performing a temperature mitigation technique when the temperature rises above a first predetermined value such that the temperature is maintained below a second predetermined value. The first predetermined value can be one of greater than the second predetermined value, equal to the second predetermined value, and less than the second predetermined value. The present method provides for several mitigations techniques for which to reduce and/or control the temperature. One such mitigation technique includes switching operation of the internal combustion engine from the fumigated fuel to the directly injected fuel. Another mitigation technique includes increasing a quantity of directly injected fuel introduced into the combustion chamber. And another mitigation technique includes reducing an equivalence ratio at which the internal combustion engine operates. In a preferred embodiment, the equivalence ratio can be reduced to between 0.88 and 0.92. Another mitigation technique includes at least one of retarding spark timing and retarding combustion phasing.

The engine operating parameters include at least fuelling quantity and fuelling frequency, or at least one parameter representative of the quantity of fuel introduced into the combustion chamber and one parameter representative of the frequency with which that quantity of fuel is introduced. Other parameters that influence in-cylinder temperature can also be among the engine operating parameters employed. For example, the engine operating parameters can be selected from engine speed, air mass flow, equivalence ratio, spark timing, combustion phasing, manifold air temperature, engine coolant temperature, effective EGR rate (for internal and external EGR), intake charge oxygen concentration, trapped oxygen mass, fuel mass flow, commanded torque, air per cycle, fumigated fuel mass fraction, intake cam position, exhaust cam position, external EGR temperature, directly injected fuel mass fraction and other engine operating parameters. The directly injected fuel can be gasoline, ethanol-gasoline blends, diesel, natural gas, ethane, methane, propane, biogas, landfill gas, dimethyl ether, hydrogen and mixtures of these fuels. The fumigated fuel can be natural gas, ethane, methane, propane, biogas, landfill gas, dimethyl ether, hydrogen and mixtures of these fuels, as well as gasoline and ethanol-gasoline blends.

The method further includes determining a steady state temperature of the direct fuel injector as a second function of the engine operating parameters. The temperature of the direct fuel injector is then determined as a function of the steady state temperature, a history of the temperature and a time constant representative of a thermal characteristic of the direct fuel injector. The time constant is determined as a function of one of a directly injected fuel mass fraction and a fumigated fuel mass fraction. The method still further includes determining a base temperature as a third function of the engine operating parameters; and determining at least one temperature correction factor as a fourth function of the engine operating parameters. The steady state temperature is then determined as a function of the base temperature and the at least one temperature correction factor.

The method further includes determining a direct steady state temperature as a fifth function of the engine operating parameters and determining a fumigated steady state temperature as a sixth function of the engine operating parameters. The direct steady state temperature is representative of a first portion of the steady state temperature of the direct fuel injector due to combustion of the directly injected fuel, and the fumigated steady state temperature is representative of a second portion of the steady state temperature due to combustion of the fumigated fuel. The steady state temperature is then determined as a function of the direct steady state temperature, the fumigated steady state temperature and one of a directly injected fuel mass fraction and a fumigated fuel mass fraction.

An improved method of fuel system protection for an internal combustion engine includes introducing a directly injected fuel into a combustion chamber through a direct fuel injector; introducing a fumigated fuel upstream of an intake valve; selectively operating the internal combustion engine with at least one of the directly injected fuel and the fumigated fuel; determining a steady state temperature of the direct fuel injector as a function of engine operating parameters; determining a transient temperature of the direct fuel injector as a function of the steady state temperature; and performing a temperature mitigation technique when the transient temperature rises above a first predetermined value such that the transient temperature is maintained below a second predetermined value. The first predetermined value and the second predetermined value are compared. Either the first predetermined value is greater than the second predetermined value; the first predetermined value is less than the second predetermined value; or the first predetermined value is equal to the second predetermined value.

An improved apparatus for fuel system protection in an internal combustion engine including a direct fuel injector for introducing a directly injected fuel into a combustion chamber of the internal combustion engine; a fumigation system for introducing a fumigated fuel upstream of an intake valve of the combustion chamber; an electronic controller programmed to select one of a direct injection mode and a fumigation mode; determine a temperature of the direct fuel injector as a function of engine operating parameters; and perform a temperature mitigation technique when the temperature rises above a first predetermined value such that the temperature is maintained below a second predetermined value. The mitigation technique can include at least one of switching operation of the internal combustion engine from the fumigation mode to the direct injection mode; increasing a quantity of directly injected fuel introduced into the combustion chamber; reducing an equivalence ratio of the internal combustion engine; retarding spark timing; and retarding combustion phasing.

DETAILED DESCRIPTION OF PREFERRED EMBODIMENT(S)

Figure 1:
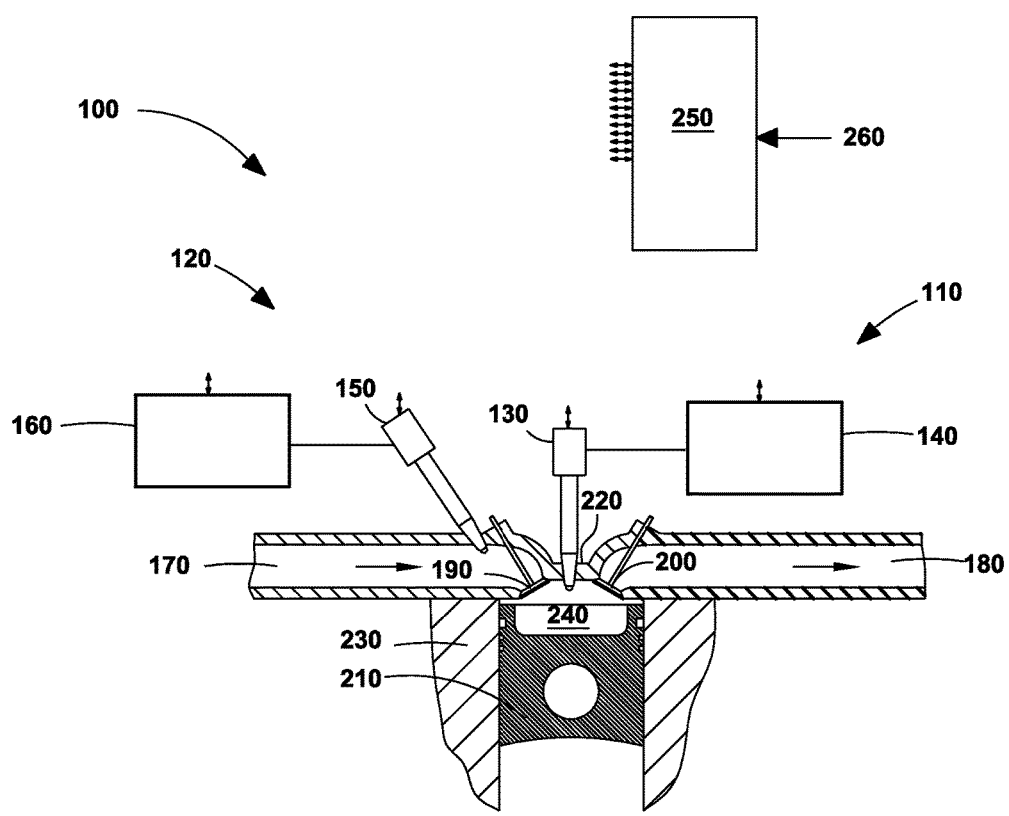
FIG. 1 is a schematic view of an internal combustion engine according to one embodiment.

Referring to the schematic view of FIG. 1, there is shown internal combustion engine 100 including direct injection system 110 and fumigated system 120. Direct injection system 110 includes at least one direct fuel injector 130 and fuel supply system 140. Direct fuel injector 130 is shown centrally located in cylinder head 220, which in other embodiments can be side-mounted in a wall of cylinder 230. Although only one cylinder 230 is illustrated, in typical embodiments there is a plurality of cylinders, and for each cylinder 230 there is a respective direct fuel injector 130. Fuel supply system 140 supplies fuel to injector 130 and includes conventional components found in direct injection systems which can vary depending upon whether the directly injected fuel is a liquid fuel or a gaseous fuel. A gaseous fuel is defined as a fuel that is in a gaseous phase at standard temperature and pressure. Fumigated system 120 includes conventional components to introduce fuel upstream of intake valve 190. In the illustration of FIG. 1, fumigated system 120 includes at least one port fuel injector 150 and fuel supply system 160. In embodiments where there is more than one cylinder 230, there can be one port fuel injector 150 for each cylinder, or one port fuel injector located further upstream in intake manifold 170 can provide fuel for more than one cylinder. In still further embodiments, fumigation system 120 can include conventional components other than fuel injectors for introducing fuel upstream of intake valve 190, for example mixers. Fuel supply system 160 supplies fuel to injector 150 and includes conventional components found in fumigated systems which can vary depending upon whether the fumigated fuel is a liquid fuel or a gaseous fuel. Engine 100 further includes exhaust manifold 180. For each cylinder there is an intake valve 190 and an exhaust valve 200. Piston 210 travels within the walls of cylinder 230. Combustion chamber 240 is formed by the space enclosed by the walls of cylinder 230, piston 210 and cylinder head 220. Engine 100 further includes an ignition source (not shown). In a preferred embodiment engine 100 is spark ignited. In other embodiments other conventional ignition sources can be employed depending upon system requirements. Electronic controller 250 communicates with and commands both direct injection system 110 and fumigated system 120 to deliver fuel for combustion in engine 100. Signal wires represented by the symbols with double arrow heads such as those on the left side of electronic controller 250, transmit measured parameters and send command signals for controlling the operation of individual components. Electronic controller 250 can include both hardware and software components. The hardware components can include digital and/or analog electronic components. In the present example electronic controller 250 includes a processor and memories, including one or more permanent memories, such as FLASH, EEPROM and a hard disk, and a temporary memory, such as SRAM and DRAM, for storing and executing a program. In another preferred embodiment electronic controller 250 is an engine control unit (ECU) for engine 100. As used herein, controller 250 is also referred to as 'the controller'. As used herein, the terms algorithm, module and step refer to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the algorithms, modules and steps herein are part of electronic controller 250.

Engine 100 can operate in multiple fuelling modes including a direct injection mode, a fumigated mode and a co-fuelling mode. In the direct injection mode, fuel for combustion in engine 100 is provided by direct injection system 110. In the fumigated mode fuel for combustion in engine 100 is provided by fumigated system 120, however depending upon engine operating conditions it is possible that fuel is also provided by direct injection system 120 as will be explained in detail below. In the co-fuelling mode, fuel for combustion is simultaneously provided by both direct injection system 110 and fumigated system 120. It is possible that engine 100 operates in a manner that it can selectively switch between these modes on a per cycle basis. Injection timing can be predetermined responsive to engine operating conditions determined from measured parameters that are inputted into electronic controller 250, and the input of such parameters among others is represented by arrow 260.

Figure 2:
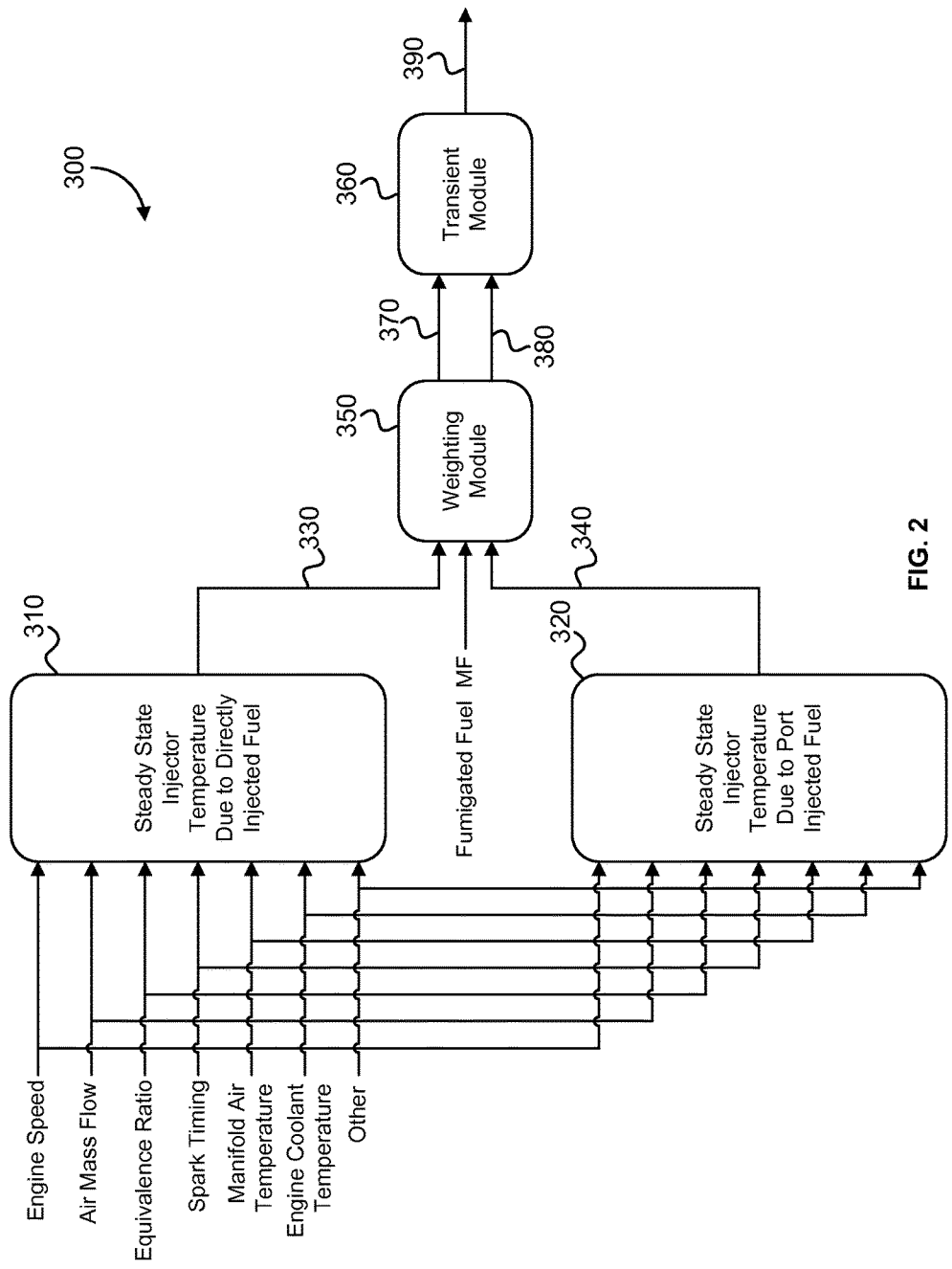
FIG. 2 is a block diagram of a fuel injector temperature determination module according to one embodiment of the internal combustion engine of FIG. 1.

Referring now to FIG. 2 there is shown a fuel injector temperature determination module 300 that estimates the temperature of direct fuel injector 130 during each of the fuelling modes of engine 100. In a preferred embodiment temperature module 300 is an algorithm performed by electronic controller 250 that in response to engine operating parameters estimates the temperature of a tip of direct fuel injector 130 on a continuous and real-time basis. The fuel system protection techniques disclosed herein make use of the injector temperature estimated by temperature module 300 to reduce short and long term damage of direct fuel injector 130, and to reduce the risk of and preferably prevent failure modes of injector 130. There are several failure modes of injector 130 due to overheating including carbon deposit formation and general fouling, seal damage and metallic valve seat damage. The engine operating parameters employed by temperature module 300 include at least fuelling quantity and fuelling frequency, or at least one parameter representative of the quantity of fuel introduced into combustion chamber 240 and one parameter representative of the frequency with which that quantity of fuel is introduced. Other parameters that influence in-cylinder temperature can also be among the engine operating parameters employed by temperature module 300. For example, the engine operating parameters employed by temperature module 300 can be selected from engine speed, air mass flow, equivalence ratio, spark timing, combustion phasing, manifold air temperature, engine coolant temperature, effective EGR rate (for internal and external EGR), intake charge oxygen concentration, trapped oxygen mass, fuel mass flow, commanded torque, air per cycle, fumigated fuel mass fraction, intake cam position, exhaust cam position, external EGR temperature, directly injected fuel mass fraction and other engine operating parameters. Fumigated fuel mass fraction is defined as the mass of fumigated fuel consumed by engine 100 divided by the total mass of fuel (fumigated fuel and directly injected fuel) consumed by engine 100. Directly injected fuel mass fraction is defined as the mass of directly injected fuel consumed by engine 100 divided by the total mass of fuel (fumigated fuel and directly injected fuel) consumed by engine 100. It has been determined that these parameters allow a representative estimation of the temperature of direct fuel injector 130 over the range of engine operating conditions. An advantage of the present technique over previous techniques is the reduction and preferably minimization of directly injected fuel consumption while operating in the fumigated mode and the co-fuelling mode. Temperature module 300 includes direct temperature module 310 and fumigated temperature module 320. Direct temperature module 310 includes a steady state temperature model for estimating the temperature of direct fuel injector 130 due to combustion of fuel introduced to combustion chamber 240 through direct fuel injector 130. When engine 100 operates exclusively in direct injection mode then module 310 alone estimates the temperature of direct fuel injector 130 for given steady state engine operating parameters. The term "steady state" as used herein is defined as the engine operating conditions that result when engine operating parameters remain at respective values within predetermined ranges. The direct temperature model in module 310 can be determined empirically and can be in the form of a look-up table and/or a mathematical formula which are responsive to the engine operating parameters to provide temperature signal 330 representing the temperature of direct fuel injector 130 due to combustion of directly injected fuel. Direct temperature module 310 outputs signal 330 on a continuous basis for the various operating modes of engine 100. Fumigated temperature module 320 includes a steady state temperature model for estimating the temperature of direct fuel injector 130 due to combustion of fuel introduced upstream of intake valve 190, for example through port fuel injector 150. When engine 100 operates exclusively in fumigated mode then module 320 alone estimates the temperature of direct fuel injector 130 for given steady state engine operating parameters. The fumigated temperature model in module 320 can be determined empirically and can be in the form of a look-up table and/or a mathematical formula which are responsive to the engine operating parameters to provide temperature signal 340 representing the temperature of direct fuel injector 130 due to combustion of fumigated fuel. Fumigated temperature module 320 outputs signal 340 on a continuous basis for the various operating modes of engine 100.

Figure 11:
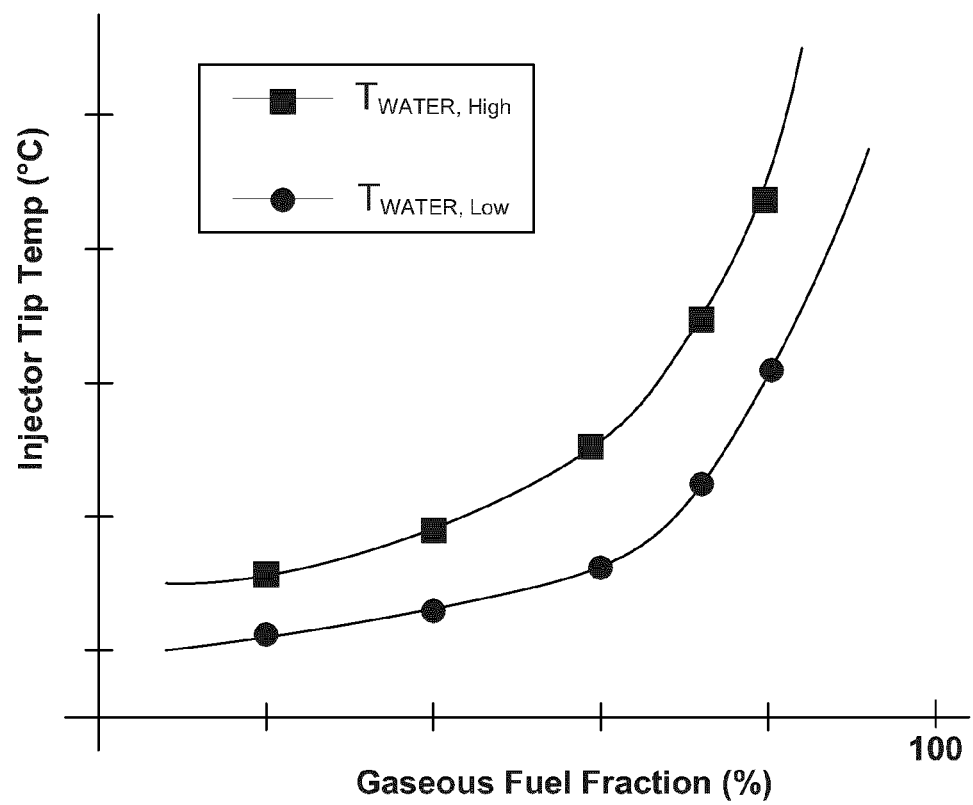
FIG. 11 is a plot of injector tip temperature versus fumigated fuel mass fraction (when the fumigated fuel is a gaseous fuel) illustrating plots for two different engine loads as represented by the temperature of engine coolant ($T_{WATER,\ HIGH}$, $T_{WATER,\ LOW}$).

Temperature module 300 further includes weighting module 350 and transient module 360. Weighting module 350 determines the temperature of direct fuel injector 130 when engine 100 operates from both directly injected and fumigated fuels. In the steady state when operating from both fuels weighting module 350 determines temperature signal 370 as a function of temperature signals 330 and 340 and one of the fumigated fuel mass fraction and the directly injected fuel mass fraction. With reference to FIG. 11, the non-linearity of temperature signal 370 to fumigated fuel mass fraction in the steady state is illustrated. In this plot, the fumigated fuel is a gaseous fuel and its mass fraction is the abscissa (x-axis) while the temperature signal 370 (the steady state injector tip temperature) is the ordinate (y-axis). Each plot line represents a particular engine load, and the line with overlapping squares is for a higher engine load compared to the line with overlapping circles. These plots illustrate that as the mass fraction of fumigated fuel increases linearly, the injector tip temperature increases non-linearly. Returning to FIG. 2, a weighting function employed by module 350 can be determined empirically and can be in the form of a look-up table and/or a mathematical formula. For example, an 1D look-up table storing a delta multiplier (DM) can be indexed by the fumigated fuel mass fraction to retrieve the delta multiplier employed by Equation 1 below to determine temperature signal 370. In Equation 1, $TS_{370}$ represents temperature signal 370, $TS_{340}$ represents temperature signal 340 and $TS_{330}$ represents temperature signal 330.

$$TS_{370}=TS_{340}+(TS_{340}-TS_{330})*DM \quad \text{(Equation. 1)}$$

Transient module 360 determines the temperature of direct fuel injector 130 during transient engine operating conditions, for example after the engine operating parameters change and before the injector temperature has reached a steady state value. When one or more engine operating parameters change, temperature modules 310 and 320 determine the steady state temperature immediately based on the new engine operating parameters. However, the temperature of direct fuel injector 130 does not change immediately when engine operating parameters change due to its thermal impedance and the thermal impedance of engine 100, but rather changes gradually over time. Transient module 360 determines injector temperature signal 390 (also called the transient temperature or the final estimated temperature of injector 130) as a function of injector temperature signal 370, time constant signal 380 and a history of injector temperature signal 390. Time constant signal 380 is representative of a thermal characteristic of direct injector 130 and engine 100 and is determined in weighting module 350 in the present embodiment as a function of the fumigated fuel mass fraction or alternatively the directly injected fuel mass fraction. An 1D look-up table storing time constant signal 380 can be indexed by the fumigated fuel mass fraction to retrieve signal 380. Module 360 applies a time constant formula against changes in temperature signal 370, which reflect changing engine parameters, to estimate the gradual change in injector temperature signal 390. One such time constant formula includes a running average function according to Equation 2 below. In Equation 2, $TS_{390,current}$ represents the existing value of temperature signal 390 which is representative of the history of signal 390, $TS_{390,new}$ represents the next value of temperature signal 390 according to the running average function, $TS_{370}$ represents temperature signal 370 and $TC_{380}$ represents time constant signal 380.

$$TS_{390,new}=TS_{390,current}*(1-TC_{380})+(TS_{370})*TC_{380} \quad \text{(Equation. 2)}$$

Figure 3:
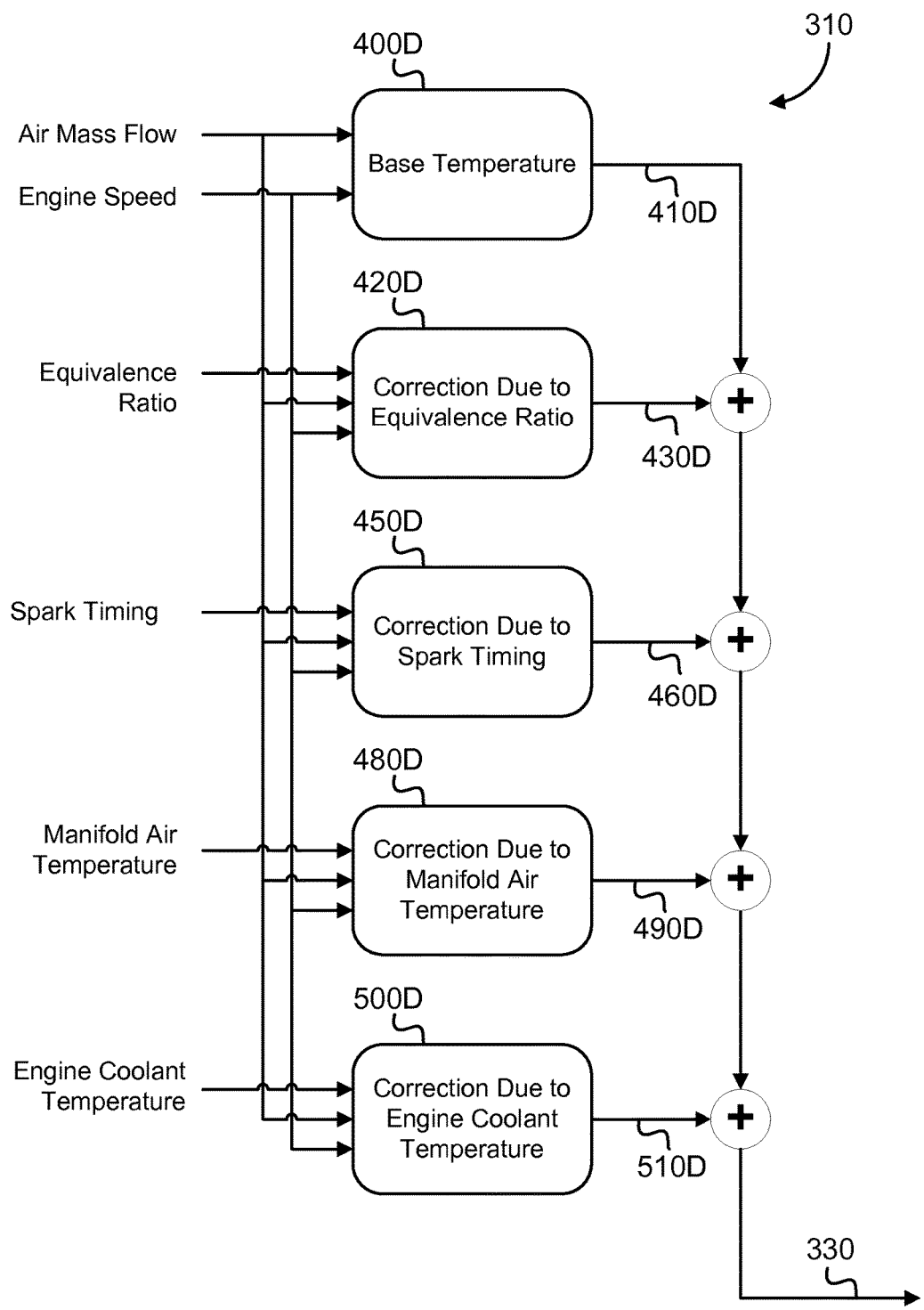
FIG. 3 is a block diagram of a steady state temperature module for the fuel injector temperature determination module of FIG. 2 according to one embodiment when the internal combustion engine of FIG. 1 operates with directly injected fuel.

Referring now to FIG. 3, direct temperature module 310 is illustrated according to another embodiment. In the embodiment of FIG. 2, module 310 determines temperature signal 330 as a function of engine operating parameters. In the embodiment of FIG. 3, module 310 employs one or more look-up tables and/or formulas to determine signal 330. Steady state base temperature module 400D determines base temperature signal 410D. In an engine operating near stoichiometry, base temperature can be determined from air mass flow and engine speed, which are representative of the quantity of fuel introduced into combustion chamber 240 and of the frequency with which that quantity of fuel is introduced. In other embodiments (not illustrated) base temperature can be determined from other engine operating parameters which are representative of the quantity of fuel introduced into combustion chamber 240 and of the frequency with which that quantity of fuel is introduced. For example, in a Diesel-cycle engine fuel mass flow and engine speed can be employed. Base temperature signal 410D represents the steady state injector temperature due to combustion of directly injected fuel. Correction module 420D determines correction signal 430D as a function of parameters known to influence in-cylinder temperature. By way of example as shown in FIG. 3 in an Otto-cycle engine the equivalence ratio, air mass flow and engine speed are parameters that can be used to determine a correction signal. Instead of equivalence ratio other determinative parameters can be employed such as excess air ratio. Correction module 450D determines correction signal 460D as a function of ignition timing. For an Otto-cycle engine as shown in FIG. 3 spark timing, air mass flow and engine speed are parameters that can influence ignition timing and temperature signal 330. Instead of spark timing other parameters determinative of ignition timing can be employed such as combustion phasing which could be employed in a non-spark ignited engine. Correction module 480D determines correction signal 490D as a function of manifold air temperature, air mass flow and engine speed and represents the variation in base temperature signal 410D due to manifold air temperature. Correction module 500D determines correction signal 510D as a function of engine coolant temperature, air mass flow and engine speed and represents the variation of base temperature signal 410D due to engine coolant temperature. For each of the modules 420D, 450D, 480D and 500D, engine operating parameters alternative to air mass flow and engine speed can be employed. Temperature signal 330 is generated by adding together signals 410D, 430D, 460D, 490D and 510D. The controller can selectively and independently disable the corrections performed by each of the correction modules 420D, 450D, 480D and 500D by setting respective correction signals 430D, 460D, 490D and 510D to zero (0). For example, if an engine sensor is damaged and the corresponding measured parameter is not reliable then the related correction can be disabled.

Figure 4:
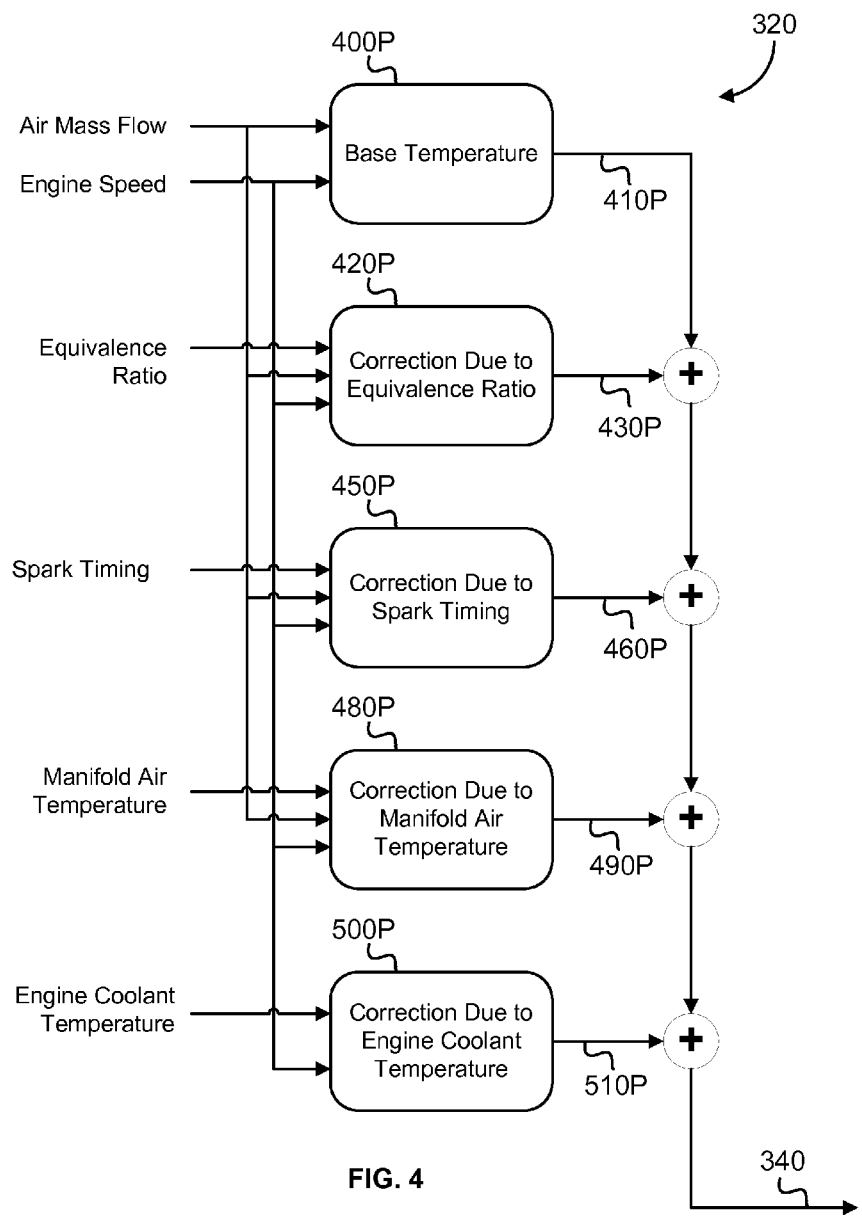
FIG. 4 is a block diagram of a steady state temperature module for the fuel injector temperature determination module of FIG. 2 according to one embodiment when the internal combustion engine of FIG. 1 operates with port injected fuel.

Referring now to FIG. 4, fumigated temperature module 320 is illustrated according to another embodiment. In the embodiment of FIG. 2, module 320 determines temperature signal 340 as a function of engine operating parameters. In the embodiment of FIG. 4, module 320 employs one or more look-up tables and/or formulas to determine signal 340. Steady state base temperature module 400P determines base temperature signal. In an engine operating near stoichiometry, base temperature can be determined from air mass flow and engine speed, which are representative of the quantity of fuel introduced into combustion chamber 240 and of the frequency with which that quantity of fuel is introduced. In other embodiments (not illustrated) base temperature can be determined from other engine parameters which are representative of the quantity of fuel introduced into combustion chamber 240 and of the frequency with which that quantity of fuel is introduced. For example, in a Diesel-cycle engine fuel mass flow and engine speed can be employed. Base temperature signal 41 OP represents the steady state injector temperature due to combustion of fumigated fuel. Correction module 420P determines correction signal 43 OP as a function of parameters known to influence in-cylinder temperature. By way of example as shown in FIG. 4 in an Otto-cycle engine the equivalence ratio, air mass flow and engine speed are parameters that can be used to determine a correction signal. Instead of equivalence ratio other determinative parameters can be employed such as excess air ratio. Correction module 450P determines correction signal 460P as a function of ignition timing. For an Otto-cycle engine as shown in FIG. 4 spark timing, air mass flow and engine speed are parameters that can influence ignition timing and temperature signal 340. Instead of spark timing other parameters determinative of ignition timing can be employed such as combustion phasing which could be employed in a non-spark ignited engine. Correction module 480P determines correction signal 490P as a function of manifold air temperature, air mass flow and engine speed and represents the variation in base temperature signal 41 OP due to manifold air temperature. Correction module 5 OOP determines correction signal 51 OP as a function of engine coolant temperature, air mass flow and engine speed and represents the variation of base temperature signal 41 OP due to engine coolant temperature. For each of the modules 420P, 450P, 480P and 500P, the engine operating parameters alternative to air mass flow and engine speed can be employed. Temperature signal 340 is generated by adding together signals 410P, 430P, 460P, 490P and 51 OP. The controller can selectively and independently disable the corrections performed by each of the correction modules 420P, 450P, 480P and 500P by setting respective correction signals 430P, 460P, 490P and 500P to zero (0). For example, if an engine sensor is damaged and the corresponding measured parameter is not reliable then the related correction can be disabled.

Figure 5:
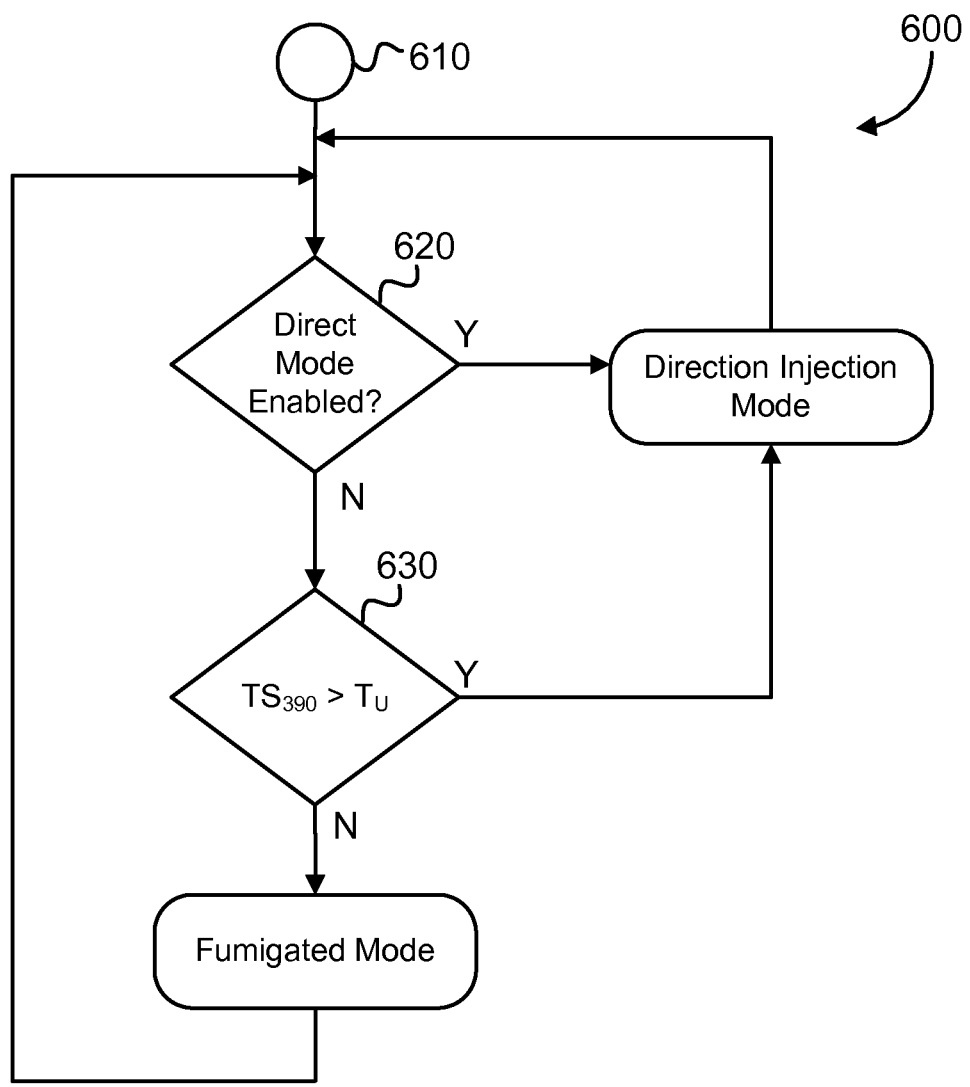
FIG. 5 is a flow chart diagram of a fuel system protection algorithm according to a first embodiment for the internal combustion engine of FIG. 1.

With reference to FIG. 5, a fuel system protection algorithm 600 that reduces and preferably prevents short term and long term damage to direct fuel injector 130 is shown according to a first embodiment. Fuel system protection algorithm 600 employs two criteria to select either the direct injection mode or the fumigated mode. The entry point to algorithm 600 is the starting of engine 100 in step 610. When engine 100 starts, the controller determines whether direct injection mode is enabled in step 620. It is advantageous to enable direct injection mode on engine start such that at least a portion of the volume of fuel within direct fuel injector 130 is purged, and more preferably the full volume of fuel within injector 130 is purged, and most preferably more than the volume of fuel within injector 130 is purged. The direction injection mode can also be enabled during operation of engine 100, for example during particular points in the operating map of engine 100 or when the supply of fumigated fuel in fuel supply system 160 is low. In step 630 the controller determines whether the temperature of direct fuel injector 130 is above an upper predetermined value. When temperature signal 390 is above the upper predetermined value direct injection mode is enabled to flow fuel through injector 130 such that the injector temperature falls below the upper predetermined value by a predetermined hysteresis amount. If none of the conditions in steps 620 and 630 are true then operation either enters or continues in fumigated mode. In alternative embodiments the controller can enable direct injections when temperature signal 390 is above the upper predetermined value such that signal 390 falls below the upper predetermined value (no hysteresis) or such that signal 390 remains below a second predetermined value that is greater than the upper predetermined value.

Figure 6:
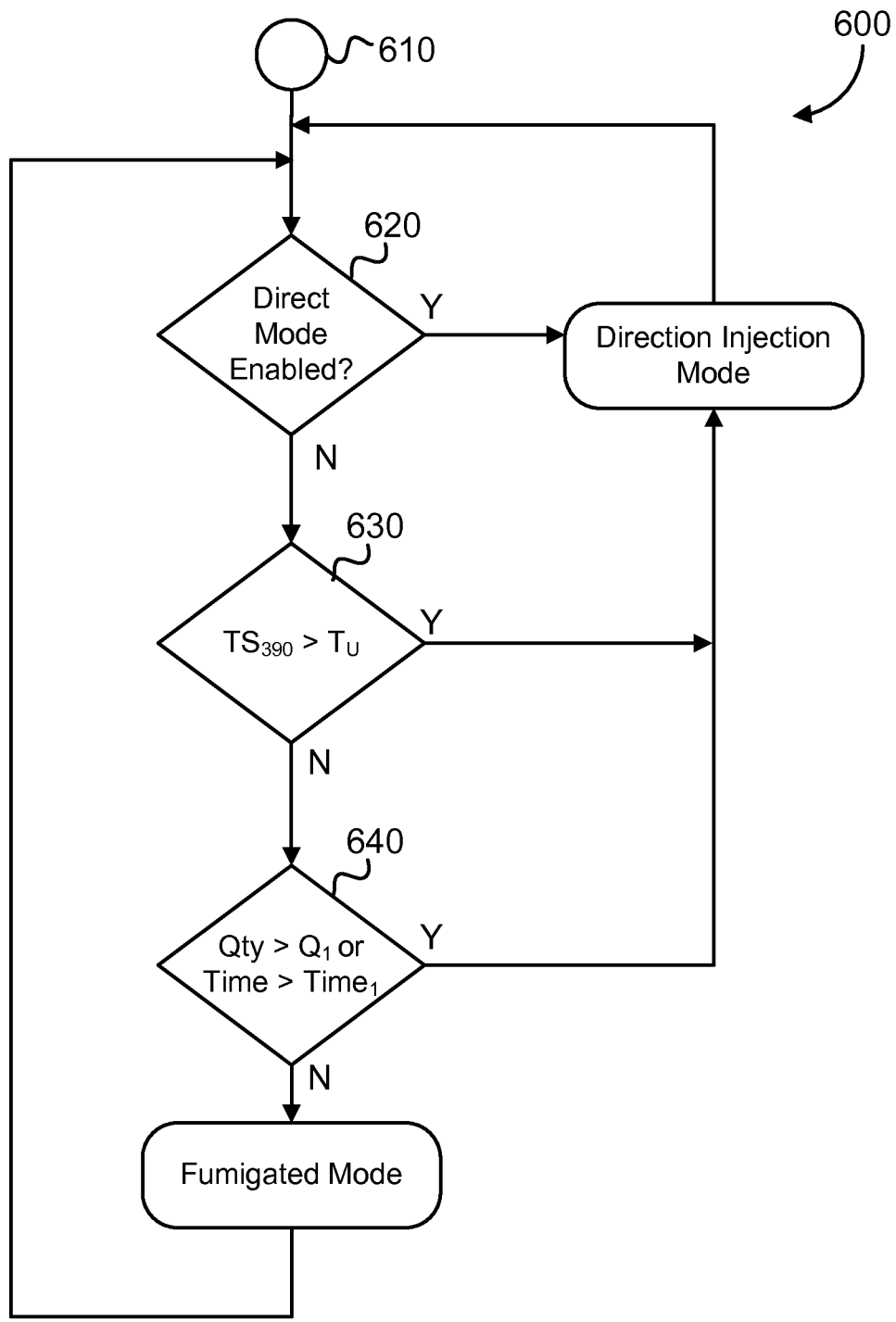
FIG. 6 is a flow chart diagram of a fuel system protection algorithm according to a second embodiment for the internal combustion engine of FIG. 1.

With reference to FIG. 6, a fuel system protection algorithm is shown according to a second embodiment that is similar to the fuel system protection algorithm shown in FIG. 5 and only the differences are discussed. In step 640 the controller employs counters to either determine whether a predetermined integrated quantity of fumigated fuel has been injected or whether engine 100 has been operating in fumigated mode for a predetermined extent of time. The integrated quantity of fuel represents the total quantity of fumigated fuel that has been introduced into combustion chamber 240 over a predetermined number of engine cycles. When either the predetermined integrated quantity or predetermined extent of time values are reached operation is switched to direct injection mode to purge fuel within direct fuel injector 130. Step 640 is advantageous to purge fuel when it has been dormant in direct fuel injectors 130 for some time in which case the fuel therein can begin to degrade. There is a corresponding counter while operating in direct injection mode which triggers a reset of the counters in fumigated mode when a predetermined integrated quantity of directly injected fuel has been introduced. If none of the conditions in steps 620, 630 and 640 are true then operation either enters or continues in fumigated mode.

Figure 7:
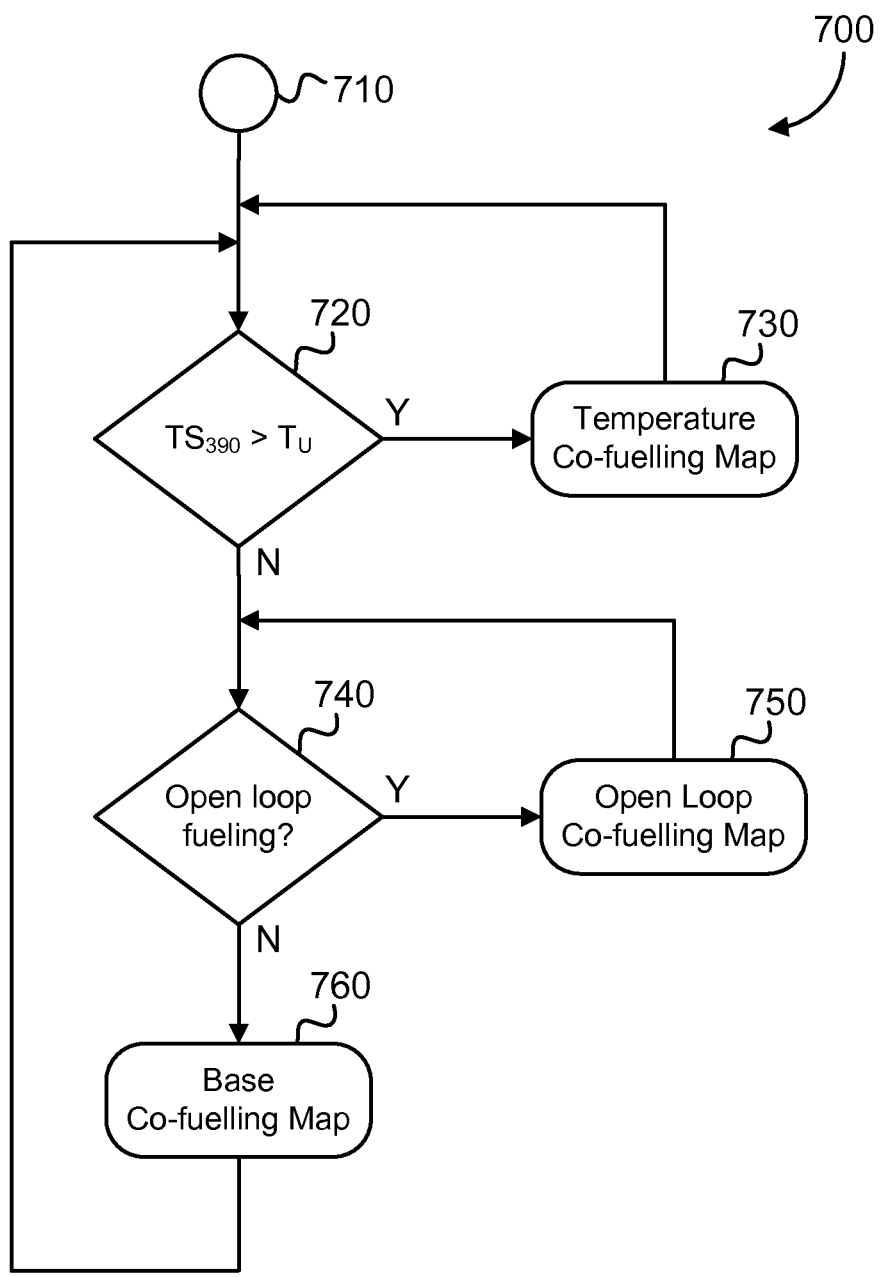
FIG. 7 is a flow chart diagram of a fuel system protection algorithm according to a third embodiment for the internal combustion engine of FIG. 1.

Referring to FIG. 7 a fuel system protection algorithm 700 that reduces and preferably prevents short term and long term damage to direct fuel injector 130 is shown according to a third embodiment. Fuel system protection algorithm 700 operates in the co-fuelling mode and employs two criteria to select one of three co-fuelling maps. The entry point to algorithm 700 is the enabling of the co-fuelling mode in step 710. The co-fuelling mode allows cooling and purging of direct fuel injector 130 under high speed and high load conditions. Under these conditions a portion of total fuel is introduced into combustion chamber 240 through direct fuel injector 130 and the remaining portion of total fuel is introduced through fumigated system 120. In step 720 the controller determines whether the temperature of direct fuel injector 130 is above the upper predetermined value, and when it is, selects temperature co-fuelling map 730. The controller employs the temperature co-fuelling map to determine the fraction of fumigated fuel versus directly injected fuel as a function of engine operating parameters (such as air mass flow and engine speed) when the direct fuel injector temperature is above the upper predetermined value. In step 740 the controller determines whether open loop fuelling is enabled, which for example is enabled for thermal protection of engine 100, such as catalyst protection and turbo protection. When enabled, the controller selects open loop fuelling map 750 which determines the fraction of fumigated fuel versus directly injected fuel as a function of engine operating parameters to provide protection to the catalyst and/or turbo. Otherwise the controller selects the base fuelling map 760 which determines the default fraction of fumigated fuel versus directly injected fuel as a function of engine operating parameters.

Figure 8:
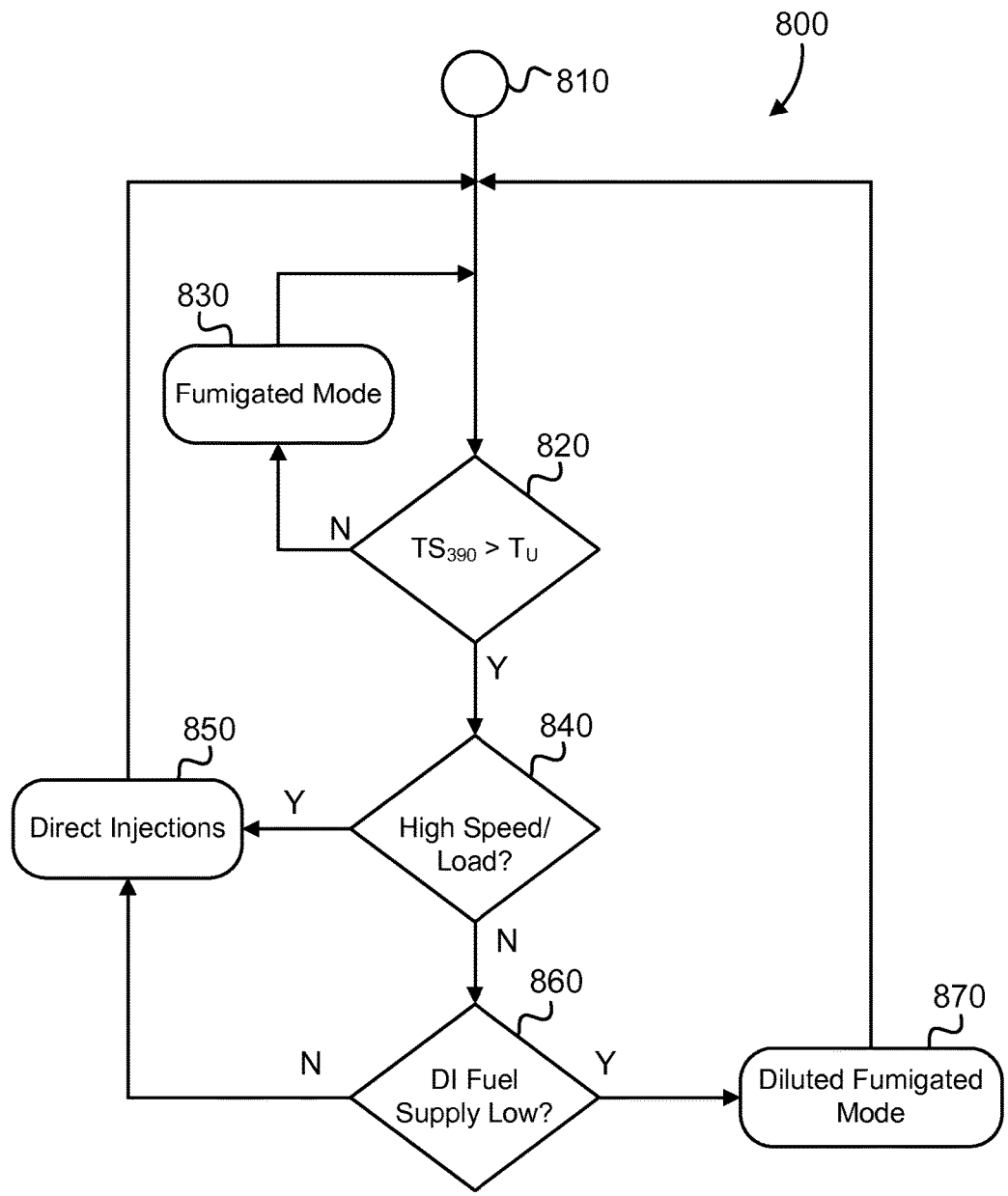
FIG. 8 is a flow chart diagram of a fuel system protection algorithm according to a fourth embodiment for the internal combustion engine of FIG. 1.

Referring now to FIG. 8 a fuel system protection algorithm 800 that reduces and preferably prevents short term and long term damage to direct fuel injector 130 is shown according to a fourth embodiment. The entry point to algorithm 800 is the starting of engine 100 in step 810. Similar to algorithm 600, the engine can start in a fuelling mode. In step 820 the controller determines whether temperature signal 390 of direct fuel injector 130 is above the upper predetermined value. After a cold start engine 100 enters fumigated mode since signal 390 is below the upper predetermined value. During a hot start or normal operation when signal 390 is above the upper predetermined value then one of the fuel system protection techniques of the present application is performed to cool direct fuel injectors 130. In step 840 the controller determines at what point in the engine operating map engine 100 is currently operating. Depending upon where in the engine operating map engine 100 is currently operating it is possible to cool the injectors without flowing fuel through direct injectors 130. Direct injections are preferably employed to cool injectors 130 in step 850 when engine 100 is operating at a high speed and/or load. In step 850 the controller can select among the fuel system protection algorithms 600 and 700 illustrated in FIGS. 5, 6 and 7. When engine 100 is not operating at a high speed and/or load then control passes to step 860 where the controller determines how much fuel is available from fuel system 140. When the supply of directly injected fuel is below a predetermined value the controller enables diluted fumigated mode in step 870. It has been determined that the steady state temperature of direct fuel injectors 130 is between 25 and 50 degrees Celsius cooler when engine 100 operates at an equivalence ratio below stoichiometry, for example when EQR=0.9. There are many known techniques for which to adjust the equivalence ratio thereby operating in diluted fumigated mode. Employing diluted fumigated mode to cool direct fuel injectors 130 reduces and preferably minimizes consumption of directly injected fuel, which is advantageous when the supply of directly injected fuel is low. When the supply of directly injected fuel is above the predetermined value then the controller employs direct injections of fuel, according to step 850 discussed above, to cool the injectors. Flowing fuel through direct injectors 130 to cool them has an advantage of improved emissions compared to diluted fumigated mode. It is noteworthy that even during high speed and/or load engine operating conditions it is possible to cool the injectors by operating in diluted fumigated mode, but the reduction in temperature is not as great as compared to when operating at a lower speed and/or load.

Figure 9:
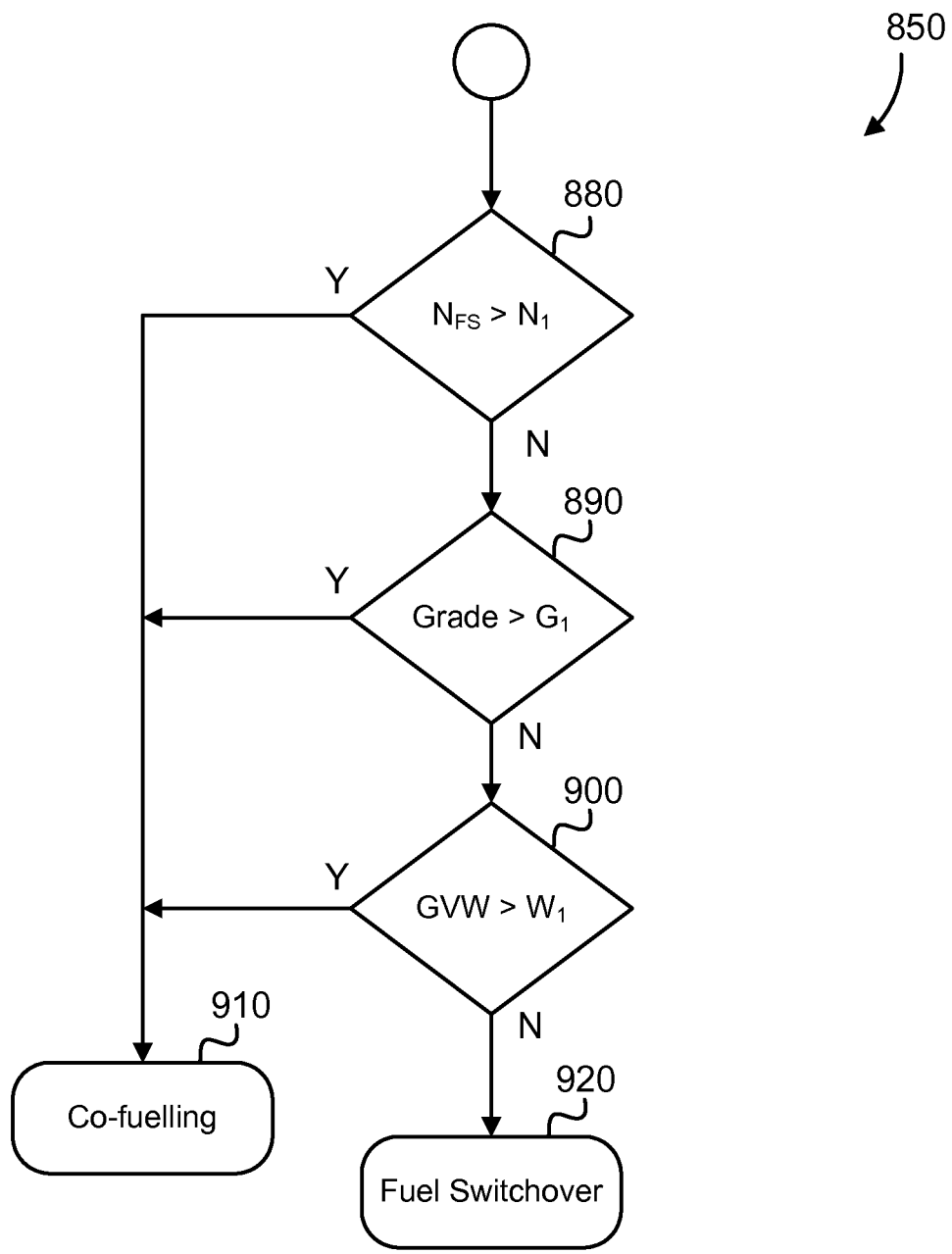
FIG. 9 is a flow chart diagram of a fuel system protection selection algorithm for the internal combustion engine of FIG. 1.

With reference to FIG. 9, a flow chart illustrating module 850 from FIG. 8 is shown. The controller performs the steps outlined in FIG. 9 to select one of the fuel system protection algorithms described in the foregoing such that direct injections of fuel can be accomplished to cool injector 130. In step 880 the controller determines whether an integrated number of fuel switchovers have been completed in a predetermined amount of time. Fuel switchover refers to the fuel system protection technique of algorithm 600 in which the fuelling mode is switched from fumigated mode to direct injection mode. There can be torque disturbances when switching fuelling modes due to inherent lags in the air handling system combined with different heating values for the different fuels resulting in equivalence ratio disturbances during switchover. Step 880 prevents, or at least reduces, excessive switchover from fumigated mode to direct injection mode to limit these torque disturbances. If the predetermined number of switchovers has occurred in the predetermined amount of time then the controller selects co-fuelling mode which is not as sensitive to torque disturbances compared to fuel switchover. In step 890 the controller determines the degree of inclination (grade or slope) on which engine 100 is currently operating. If the grade or slope is above a predetermined value then the controller selects co-fuelling mode. When engine 100 operates on steep inclinations there can be a tendency for excessive fuel switchovers. In step 900 the controller determines whether the gross vehicle weight is greater than a predetermined value, and if it is, selects the co-fuelling mode. The predetermined value is representative of a large load, for example, the towing of a trailer or hauling of cargo. There can be a tendency to excessive fuel switching when the vehicle is carrying a large load. The controller performs a fuel switchover in step 920 when none of the steps 880, 890 and 900 are true.

Figure 10:
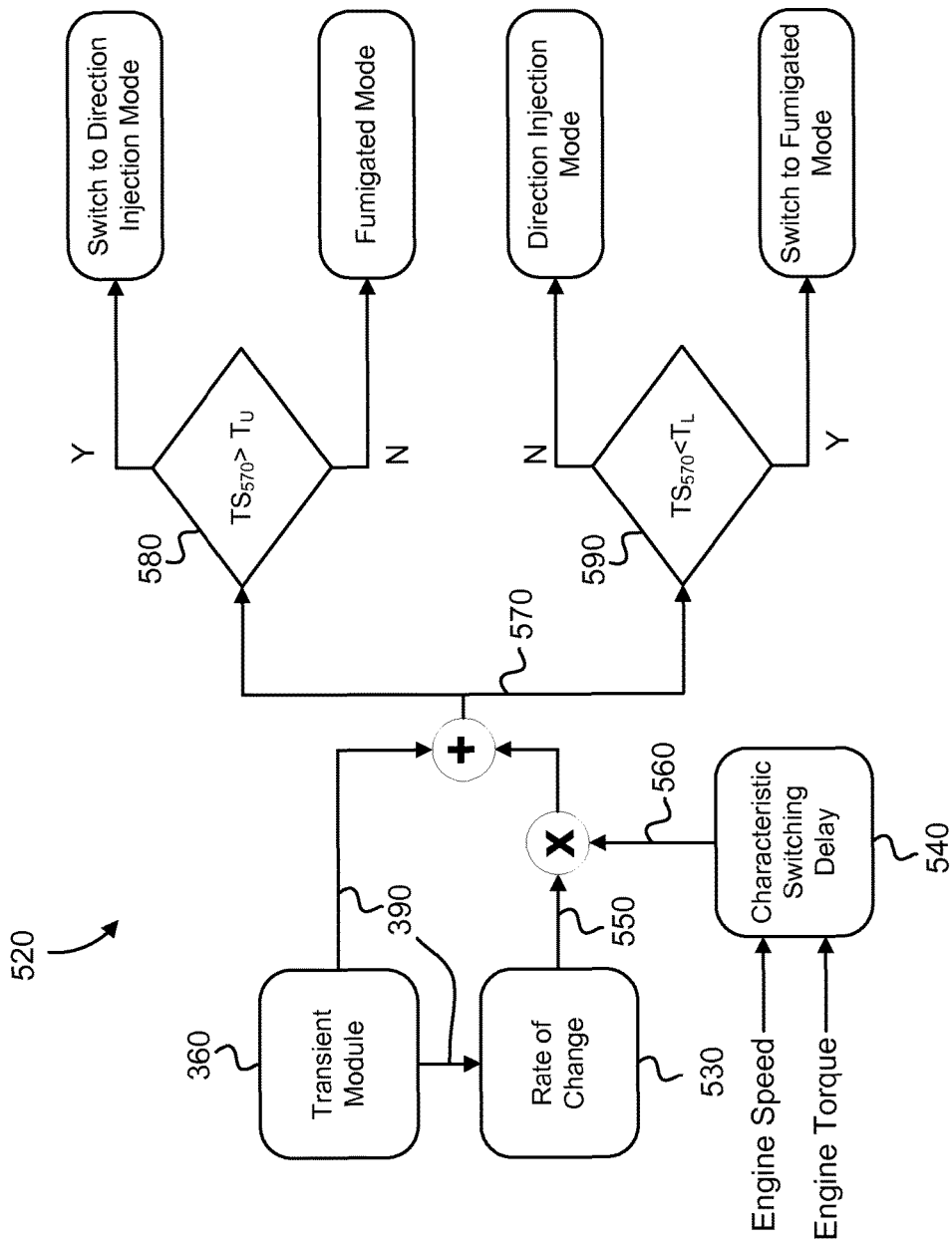
FIG. 10 is a flow chart diagram of an overshoot/undershoot temperature mitigation algorithm.

Referring now to FIG. 10, an overshoot/undershoot temperature mitigation algorithm 520 is illustrated. During operation of engine 100 it has been observed that a measured temperature of direct injector 130 (for example by temporary attachment of a thermocouple to injector 130) can overshoot the upper predetermined temperature (Tu) during upward temperature trends and undershoot a lower predetermined temperature (TL) during downward temperature trends under certain operating conditions. That is the measured and determined temperature of injector 130 momentarily reduce their correspondence in the control band. This momentary phenomenon is related to the rate of change of the temperature of injector 130 and an amount of time it takes to switch from one fuelling mode to another. For example, when the controller determines that direct injections are required while operating in fumigated mode it can increase the quantity of directly injected fuel to a level on the next engine cycle. However, due to the inertia of the air handling system the quantity of directly injected fuel is ramped in such that engine 100 operates in the co-fuelling mode momentarily to reduce and preferably minimize torque disturbances. The ramping in of the directly injected fuel delays the cooling effect such that an overshoot situation can occur increasing the risk of injector damage. Similarly, when engine 100 is operating in direct injection mode such that injectors 130 are being cooled and temperature signal 390 has started on a downward trend the controller will switch back to fumigated mode once signal 390 reaches the lower predetermined value. However, due to the inertia of the air handling system the switchover to fumigated mode is ramped in such that engine 100 operates temporarily in the co-fuelling mode to reduce and preferably minimize torque disturbances. The ramping in of the fumigated fuel delays the deactivation of the active cooling of injector 130 such that an undershoot situation can occur resulting in unnecessary consumption of directly injected fuel. Algorithm 520 monitors the upward and downward temperature trends of transient temperature signal 390 and selects one of the fumigated mode and the direction injection mode in a feed-forward manner. Rate of change determination module 530 determines rate of change signal 550 representing the rate of change of signal 390. Characteristic switching delay module 540 is responsive to engine operating parameters to determine switch delay signal 560 representative of an amount of time required for a fuelling mode switch. In the present embodiment module 540 is responsive to engine speed and engine torque to determine signal 560, but in other embodiments other engine operating parameters can be employed. Rate of change signal 550 is multiplied by switch delay signal 560 and the product is summed with temperature signal 390 to generate adjusted temperature signal 570. During an upward trend when operating in fumigated mode, the controller determines in step 580 whether adjusted temperature signal 570 is above the upper predetermined value, and if so begins the switch to direct injection mode, otherwise remains in fumigated mode. During a downward trend when operating in direct injection mode, the controller determines in step 590 whether adjusted temperature signal 570 is below the lower predetermined value, and if so begins the switch to fumigated mode, otherwise remains in direct injection mode. Algorithm 520 reduces overshoots thereby reducing risk of injector damage, and reduces undershoots thereby reducing consumption of directly injected fuel.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A method of fuel system protection for an internal combustion engine, the method comprising:
   introducing a directly injected fuel into a combustion chamber through a direct fuel injector;
   introducing a fumigated fuel upstream of an intake valve;
   selectively operating said internal combustion engine with at least one of said directly injected fuel and said fumigated fuel;
   determining a steady state temperature of said direct fuel injector as a function of engine operating parameters;
   determining a temperature of said direct fuel injector as a function of said steady state temperature, a history of said temperature and a time constant representative of a thermal characteristic of said direct fuel injector; and
   performing a temperature mitigation technique when said temperature rises above a first predetermined value such that said temperature is maintained below a second predetermined value,
   wherein said time constant is determined as a function of one of a directly injected fuel mass fraction and a fumigated fuel mass fraction.

2. The method of claim 1, wherein said first predetermined value is greater than said second predetermined value.

3. The method of claim 1, wherein said first predetermined value and said second predetermined value are related by one of:
   said first predetermined value is less than said second predetermined value; and
   said first predetermined value is equal to said second predetermined value.

4. The method of claim 1, wherein said mitigation technique comprises switching operation of said internal combustion engine from only said fumigated fuel to only said directly injected fuel.

5. The method of claim 1, wherein said mitigation technique comprises increasing a quantity of directly injected fuel introduced into said combustion chamber.

6. The method of claim 1, wherein said mitigation technique comprises reducing an equivalence ratio of said internal combustion engine.

7. The method of claim 6, wherein said equivalence ratio is reduced to between 0.88 and 0.92.

8. The method of claim 1, wherein said mitigation technique comprises at least one of retarding spark timing and retarding combustion phasing.

9. The method of claim 1, wherein said engine operating parameters comprise at least one parameter representative of a quantity of fuel introduced into said combustion chamber, and at least one parameter representative of how often said quantity of fuel is introduced into said combustion chamber.

10. The method of claim 1, wherein said engine operating parameters comprise at least two of engine speed, air mass flow, engine coolant temperature, equivalence ratio, spark timing, combustion phasing, manifold air temperature, effective EGR rate, intake charge oxygen concentration, trapped oxygen mass, fumigated fuel mass fraction, intake cam position, exhaust cam position, external EGR temperature and directly injected fuel mass fraction.

11. The method of claim 1, further comprising:
determining a base temperature as a third function of said engine operating parameters; and
determining at least one temperature correction factor as a function of said engine operating parameters;
wherein said steady state temperature is determined as a function of said base temperature and said at least one temperature correction factor.

12. The method of claim 1, wherein said directly injected fuel is selected from the group consisting of gasoline, ethanol-gasoline blends and diesel.

13. The method of claim 1, wherein said fumigated fuel is natural gas.

14. The method of claim 1, wherein said fumigated fuel is selected from the group consisting of ethane, methane, propane, biogas, landfill gas, dimethyl ether, hydrogen and mixtures thereof.

15. An apparatus for fuel system protection in an internal combustion engine comprising:
a direct fuel injector for introducing a directly injected fuel into a combustion chamber of said internal combustion engine;
a fumigation system for introducing a fumigated fuel upstream of an intake valve of said combustion chamber;
an electronic controller programmed to:
select one of a direct injection mode and a fumigation mode;
determine a steady state temperature of said direct fuel injector as a function of engine operating parameters;
determine a temperature of said direct fuel injector as a function of said steady state temperature, a history of said temperature and a time constant representative of a thermal characteristic of said direct fuel injector; and
perform a temperature mitigation technique when said temperature rises above a first predetermined value such that said temperature is maintained below a second predetermined value,
wherein said time constant is determined as a function of one of directly injected fuel mass fraction and a fumigated fuel mass fraction.

16. The apparatus of claim 15, wherein said temperature mitigation technique comprises at least one of:
switching operation of said internal combustion engine from said fumigation mode to said direct injection mode;
increasing a quantity of directly injected fuel introduced into said combustion chamber;
reducing an equivalence ratio of said internal combustion engine; retarding spark timing; and
retarding combustion phasing.

17. A method of fuel system protection for an internal combustion engine, the method comprising:
introducing a directly injected fuel into a combustion chamber through a direct fuel injector;
introducing a fumigated fuel upstream of an intake valve;
selectively operating said internal combustion engine with at least one of said directly injected fuel and said fumigated fuel;
determining a direct steady state temperature of said direct fuel injector as a function of said engine operating parameters, said direct steady state temperature representative of a first portion of a steady state temperature of said direct fuel injector due to combustion of said directly injected fuel;
determining a fumigated steady state temperature as a function of said engine operating parameters, said fumigated steady state temperature representative of a second portion of said steady state temperature of said direct fuel injector due to combustion of said fumigated fuel;
determining said steady state temperature of said direct fuel injector as a function of said direct steady state temperature, said fumigated steady state temperature and one of a directly injected fuel mass fraction and a fumigated fuel mass fraction;
determining a temperature of said direct fuel injector as a function of said steady state temperature of said direct fuel injector, a history of said temperature and a time constant representative of a thermal characteristic of said direct fuel injector; and
performing a temperature mitigation technique when said temperature rises above a first predetermined value such that said temperature is maintained below a second predetermined value.

* * * * *

UNITED STATES PATENT AND TRADEMARK OFFICE
CERTIFICATE OF CORRECTION

| | |
|---|---|
| PATENT NO. | : 9,909,513 B2 |
| APPLICATION NO. | : 14/569767 |
| DATED | : March 6, 2018 |
| INVENTOR(S) | : Raymond Bzymek et al. |

It is certified that error appears in the above-identified patent and that said Letters Patent is hereby corrected as shown below:

On the Title Page

Column 2, Line 8 Item (56), References Cited, U.S. Patent Documents, Page 2:
"9,500,168 B2* 11/2016 Takarai" should read --9,500,168 B2* 11/2016 Foege--

In the Claims

Column 15, Claim 11, Line 13:
"determining a base temperature as a third function" should read --determining a base temperature as a function--

Signed and Sealed this
Ninth Day of July, 2019

Andrei Iancu
*Director of the United States Patent and Trademark Office*